Patented Dec. 18, 1951

2,578,696

UNITED STATES PATENT OFFICE 2,578,696

N-(2-CHLOROETHYL)-N-PIPERONYL AMINES

William S. Gump, Upper Montclair, and Edward Joseph Nikawitz, Passaic, N. J., assignors to The Givaudan Corporation, New York, N. Y., a corporation of New Jersey No Drawing. Application July 20, 1949, Serial No. 105,886

3 Claims. (Cl. 260—338)

This invention relates to novel aromatic haloamines and salts thereof.

These novel chemicals are tertiary amines having —CH$_2$CH$_2$Cl and

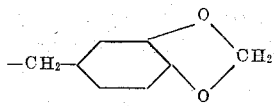

as two of the N-substituents, and salts thereof with acids.

Specific members of our novel chemical compounds include the following:

N-(2-chloroethyl)-N-piperonyl ethylamine hydrochloride

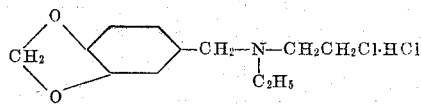

and

N-(2-chloroethyl)-N-piperonyl benzylamine hydrochloride

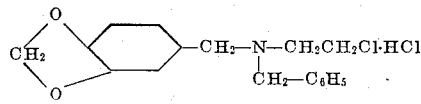

In general, the novel salts of this invention may be prepared by reacting an equivalent amount of inorganic or organic acids with the corresponding amines, preferably in some cases under anhydrous or substantially anhydrous conditions. The amines may be prepared by reacting the corresponding hydrohalides with at least an equivalent amount of alkaline material, such as, for example potassium carbonate. The hydrohalides may be prepared in general by reacting the beta - alcohols of the amines with thionyl chloride or hydrogen bromide.

The new salts of this invention are crystalline solids under usual atmospheric conditions and in general are soluble in alcohols and glycols, difficulty soluble in water and insoluble in ether and hydrocarbons. The new amines are in general high boiling liquids, varying in color from water-white to yellow. They are not soluble in water, but dissolve in ethyl alcohol, propylene glycol, and organic solvents generally.

Our novel chemical compounds exhibit unexpected and desirable medicinal properties, for example, as sympatholytic and adrenolytic agents. For therapeutic purposes these novel compounds may be administered orally or parenterally, and may be employed as tablets or in capsules or in solutions. In addition to their therapeutic properties our novel compounds are useful in organic chemical synthesis.

While our invention comprehends salts of the amines set forth above and acids in general, we prefer to employ those acids having an ionization constant of at least about $1 \times 10^{-2}$ at normal room temperature (about 25° C.). Examples of some suitable organic acids are picric, trichloroacetic, oxalic and maleic acids. Examples of some suitable inorganic acids are hydrochloric, hydrobromic, sulfuric, phosphoric (first hydrogen) perchloric, nitric and iodic acids.

In order to illustrate this invention more fully but without thereby limiting it, the following examples are given.

EXAMPLE 1

*Preparation of N-(2-chloroethyl)-N-piperonyl ethylamine hydrochloride*

(a) PREPARATION OF 2-(N-ETHYL-N-PIPERONYL) AMINO ETHANOL

Piperonyl chloride (3,4-methylene dioxybenzylchloride), 43 grams, were dropped during thirty minutes into 50 grams of 2-ethylamino ethanol while stirring and maintaining a temperature of 110° C. The temperature and agitation were maintained for four hours. A solution of 12 grams of sodium hydroxide in 200 cc. of water was added to the mixture after cooling it to room temperature. The amino alcohols were shaken out with 400 cc. of benzene and the latter solution was washed twice with 200 cc. of water each time, and finally dried with anhydrous sodium sulfate. After removal of the solvent, 30.2 grams of a yellow oil, boiling at 165° C. to 170° C., was obtained by distillation under 4 mm. of mercury pressure. This oil represented the desired amino alcohol with a purity of 97 per cent as determined by potentiometric titration.

(b) PREPARATION OF N-(2-CHLOROETHYL)-N-PIPERONYL ETHYLAMINE HYDROCHLORIDE

Thionyl chloride (15 grams) dissolved in 100 cc. of chloroform was dropped during two hours into a stirred solution of 22.3 grams of 2-(N-ethyl-N-piperonyl) amino ethanol in 100 cc. of chloroform. After allowing the mixture to remain at room temperature for twelve hours the solvent was distilled off. The residue was moistened with 10 cc. of alcohol and the same was removed by heating to 100° C. in vacuum. The residual solid was dissolved in 150 cc. of boiling, absolute alcohol in the presence of decolorizing carbon. The resulting solution was filtered and 150 cc. of ethyl ether were added. After keeping the mixture in the refrigerator for a few hours, the crystals were filtered, washed with ether and dried. This purification procedure was repeated.

The desired compound was obtained in a yield of 11.6 grams of white crystals having a melting point of 179° C. to 182° C. and upon analysis 12.7 per cent ionized chlorine was found and 25.5 per cent of total chlorine was found, these being the theoretical amounts respectively.

EXAMPLE 2

*Preparation of N-(2-chloroethyl)-N-piperonyl benzylamine hydrochloride*

(a) PREPARATION OF 2-(N-BENZYL-N-PIPERONYL) AMINO ETHANOL

Piperonyl chloride (43 grams) was condensed with 80 grams of 2-N-benzylamino ethanol following the procedure described under Example 1 (a). The desired amino alcohol was obtained as a yellow oil in a yield of 34.4 grams, having a boiling point at 4 mm. of mercury of 220° C. to 226° C., $n_D^{20}=1.5760$, purity was 99 per cent (determined by potentiometric titration).

(b) PREPARATION OF N-(2-CHLOROETHYL)-N-PIPERONYL BENZYLAMINE HYDROCHLORIDE

The amino alcohol (28.5 grams) was dissolved in 100 cc. of chloroform and reacted with a solution of 15 grams of thionyl chloride in 100 cc. of chloroform, following the procedure described under Example 1 (b). Two hundred cc. (200 cc.) each of alcohol and ether were used for the first crystallization. The second purification was carried out with 200 cc. of alcohol and 300 cc. of ether. The yield of the desired compound amounted to 14.7 grams of white crystals, melting at 188° C. to 191° C.

Upon analysis 10.4 per cent of ionized chlorine and 20.9 per cent of the total chlorine were found. These compare with the theoretical values of 10.4 per cent ionized chlorine and 20.4 per cent total chlorine, respectively.

The foregoing illustrates the practice of this invention, which however, is not to be limited but is to be construed as broadly as permissible in view of the prior art and limited solely by the appended claims.

We claim:

1. N-(2-chloroethyl)-N-piperonyl ethylamine hydrochloride.

2. N-(2-chloroethyl)-N-piperonyl benzylamine hydrochloride.

3. Tertiary amines having the formula:

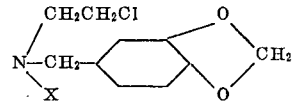

wherein X is a member selected from the group consisting of benzyl and ethyl radicals, and salts thereof with acids having an ionization constant of at least $1 \times 10^{-2}$ at 25° C.

WILLIAM S. GUMP.
EDWARD JOSEPH NIKAWITZ.

REFERENCES CITED

The following references are of record in the file of this patent:

UNITED STATES PATENTS

| Number | Name | Date |
|---|---|---|
| 1,073,966 | Decker | Sept. 23, 1913 |
| 2,088,941 | Bockmuhl | Aug. 3, 1937 |

FOREIGN PATENTS

| Number | Country | Date |
|---|---|---|
| 48,335 | Austria | June 10, 1911 |
| 12,550 | Great Britain | of 1911 |